United States Patent [19]
Kline

[11] Patent Number: 5,352,532
[45] Date of Patent: Oct. 4, 1994

[54] PANEL AND METHOD OF MAKING SAME

[75] Inventor: James R. Kline, Petoskey, Mich.

[73] Assignee: Glass Alternatives Corp., Petosky, Mich.

[21] Appl. No.: 936,063

[22] Filed: Aug. 26, 1992

Related U.S. Application Data

[63] Continuation of Ser. No. 389,338, Aug. 3, 1989, abandoned.

[51] Int. Cl.$^5$ .............................. B32B 9/04; E06B 3/24
[52] U.S. Cl. ...................................... 428/447; 428/34; 428/142; 428/161; 428/172; 428/336; 428/412; 428/425.5; 428/451; 428/908.8; 428/913; 428/542.2; 52/788
[58] Field of Search ................. 428/34, 156, 141, 161, 428/142, 172, 195, 412, 908.8, 913.3, 542.2, 425.5, 428, 429, 446, 447, 336, 451, 913; 52/788

[56] References Cited

U.S. PATENT DOCUMENTS

| | | | |
|---|---|---|---|
| 4,666,779 | 5/1987 | Curry | 428/412 |
| 4,683,169 | 7/1987 | Curry et al. | 428/412 |
| 4,708,908 | 11/1987 | Tateoka et al. | 428/447 |
| 4,710,426 | 12/1987 | Stephens | 428/447 |
| 4,753,827 | 6/1988 | Yoldas et al. | 428/447 |
| 4,778,721 | 10/1988 | Sliemers et al. | 428/447 |
| 4,791,010 | 12/1988 | Hanley et al. | 428/34 |
| 4,801,495 | 1/1989 | van der Hoeven | 428/542.2 |
| 4,814,213 | 3/1989 | Thorn | 428/34 |
| 4,975,307 | 12/1990 | Sollogoub | 428/34 |

*Primary Examiner*—Donald J. Loney
*Attorney, Agent, or Firm*—Reising, Ethington, Barnard, Perry & Milton

[57] ABSTRACT

A decorative, light transmitting panel including opposite inner and outer faces is formed on a substrate comprising injection molded clear plastic resin having a low level of process induced internal stress and at least one optical quality surface finish underlying the outer panel surface for optimizing light transmission through the resin. A thin, hard, transparent, abrasion and chemical resistant and ultraviolet light resistant protective layer or coating of plastic resin is permanently bonded to the optical quality surface finish of the low stress substrate to form at least one outer surface of the whole panel and the coating provides a hard, tough abrasion resistant outer surface capable of lasting a long time without substantial diminishment of light transmission through the panel. The low internal stress of the molded resin substrate provides superior adhesion for permanently bonding the hard protective coating to prevent microcracking and/or delamination during normal thermal cycling between −40° F. and +170° F. A second panel may be assembled in spaced parallel relation with the decorative outer panel to provide outstanding thermal efficiency, safety, security and high strength.

13 Claims, 5 Drawing Sheets

FIG. 5.

PANEL AND METHOD OF MAKING SAME

This application is a continuation of application Ser. No. 07/389,338, filed Aug. 3, 1989, now abandoned.

BACKGROUND OF THE INVENTION

1. Field of the Invention

The present invention relates to new and improved light transmitting decorative panels designed for use in windows, doors, skylights, transoms, cabinets, furniture, light fixtures, canopies and the like and having a decorative outer surface formed with a thin, hard, tough layer of abrasion resistant material to closely resemble a decorative glass surface. Panels constructed in accordance with the present invention are designed to simulate and/or replace glass panels and are substantially lower in cost, have a high resistance to breakage, are lighter in weight, while all the time closely resembling or simulating the decorative appearance of much more expensive cut glass or stained glass panels of the type heretofore used in doors, windows, canopies transoms, skylights, cabinets etc., and the like.

2. Description of the Prior Art

In the past, highly skilled artisans have created beautiful decorative panels of stained and leaded glass for use in doors, windows, transoms, furniture cabinets, and the like. However, these types of panels were subject to a number of difficulties and now are prohibitively expensive for ordinary usage, for one reason because of a lack of skilled craftsmen in the field. In addition, cut glass and stained glass panels are extremely labor intensive, easily broken, heavy in weight and relatively weak in strength resulting in structural problems when used in moving applications such as swinging or sliding doors. Prior art leaded glass panels are structurally weak in the areas along the lead strips and are also thermally inefficient in these areas. Moreover, prior art leaded glass panels do not provide adequate safety and security and as a result, wider usage of these type of panels is curtailed even though the decorative aspects thereof are desired.

Attempts have been made to duplicate the appearance of expensive leaded glass panels by utilizing plastic materials instead of glass, however, many problems still remain in that such panels tend to cloud up, craze or become somewhat opaque over time and the outer surface is easily scratched and/or nicked in the ordinary course of usage and this greatly detracts from the esthetic appearance thereof. In addition, many prior panels were not strong and even though relatively light in weight, these panels were often easily broken in normal mechanical usage as in doors, windows, etc., and the like. Moreover, such prior art panels have been subject to rapid deterioration caused by weather and ultra-violet radiation and in applications such as aircraft canopies, external light fixtures, and the like, crazing, cracking and/or clouding of the material often occurs before an economically suitable useful lifetime has occurred. Attempts at providing a hard surface coating on molded plastic panels have been troubled because of adhesion problems and micro-cracking and/or separtion of the coating layer from the underlying substrate.

OBJECTS OF THE PRESENT INVENTION

It is therefore an object of the present invention to provide a new and improved decorative, light transmitting panel which eliminates many or all of the difficulties and problems mentioned heretofore which were encountered with more expensive leaded glass and stained glass panels and imitation plastic panels attempting to simulate the appearance thereof.

Another object of the present invention is to provide a new and improved light transmitting panel which is light in weight, extremely strong and which has a thin, hard, abrasion resistant, transparent outer surface layer to provide an excellent esthetic appearance over many years without substantial diminishment because of prolonged exposure to the weather and/or ultra-violet light.

Another object of the present invention is to provide a new and improved decorative, light transmitting panel formed of molded plastic resin having an extremely low range of mold induced stress remaining in the resinous panel in the material after the manufacturing operation is completed.

More particularly, it is an object of the present invention to provide a new and improved light transmitting, decorative panel formed of injection molded plastic resin having an outer layer or coating of clear, thin, hard, glossy surfaced, abrasion resistant and ultra-violet light resistant material.

Still another object of the present invention is to provide a new and improved light transmitting, decorative panel of the character described which closely simulates or duplicates the appearance of a much more expensive cut glass or stained glass panel at a fraction of the cost thereof.

Still another important object of the present invention is the provision of a decorative molded plastic panel having a low level of internal stress which facilitates the permanent adhesion of a hard surface coating thereon to resist abrasion and resist a tendency to separate from the underlying panel over time during exposure to the weather.

Still another object of the present invention is to provide a new and improved decorative, light transmitting panel of the character described which can be manufactured on a mass production basis at relatively low cost per unit to provide high impact resistance, high surface abrasion resistance and excellent color retention characteristics so as to closely resemble a cut glass or stained glass decorative panel.

Yet another object of the invention is to provide a new and improved hard surface coated decorative molded plastic panel which does not require post annealing to reduce internal stresses.

It is another object of the present invention to provide a new and improved decorative panel of the character described which is easily tinted to provide better thermal efficiency, excellent security, better protection against the harmful effects of infared and UV ranges of light as well as an improved decorative appearance.

It is yet another object of the present invention to provide a new and improved decorative panel unit providing spaced apart parallel panels for improved thermal efficiency, improved safety and security, excellent vandal resistance properties including high resistance against penetration by small caliber firearms, all without sacrifice of the improved decorative appearance.

Another object of the invention is to provide a new and improved decorative panel of the character described which eliminates the need for iron bars or metal screens when installed in many high risk areas.

Still another object of the invention is to provide a new and improved decorative panel unit of the character described which provides an improved security factor not easily recognized by a would-be intruder yet without sacrifice of the decorative aspects of the panel and an inside user's vision outwardly through the panel.

BRIEF SUMMARY OF THE INVENTION

The foregoing and other objects and advantages of the present invention are accomplished in a new and improved light transmitting decorative panel having opposed inner and outer surfaces and formed with a substrate of molded, light transmitting plastic resin having a relatively low level of process or mold induced internal stress remaining after manufacture, for example in the range of 1500 psi or less. The substrate is formed with at least one optical quality surface finish for optimizing light transmission through the resin. The panel includes a thin, tough, hard, transparent, abrasion resistant and ultraviolet light resistance outer protective layer formed of plastic resin and is permanently bonded to the optical quality surface finish of the substrate. The permanently laminated or bonded protective layer forms a glossy appearing outer surface for the panel suitable for long exposure to the atmosphere and weather without diminishment of the light transmitting characteristics thereof. The relatively low level of internal stress in the substrate has been found to be especially effective in improving the adhesion of the outer protective layer to the substrate so that normal thermal cycling between −40 to +170° F. does not result in cracking or delamination of the hard coating layer.

In accordance with a method of the present invention, the unique panels are formed in a low stress injection molding process wherein internal stresses remaining in the panel substrate after manufacture are maintained below 1500 psi or less and wherein at least one of the molded faces of the panel substrate has an optical quality, surface finish. Plastic resins such as a polycarbonate resin or acrylic resin is injected into a precision, highly polished mold while in a liquid state at a relatively high temperature and is cured to a solid state while still remaining within the mold cavity.

The resin of the substrate is injected into the mold at an initially high injection pressure to 60,000 psi and a vacuum is applied to the mold cavity to rapidly draw the resin into the mold cavity while the cavity surfaces are maintained at a relatively high temperature so as to preclude premature skin formation or crusting of the material as it first enters and fills the mold cavity, thereby insuring that a completely filled cavity is rapidly obtained. The molded substrate of the panel is cured in a relatively short period of time while still in the mold and thereafter when the mold is opened and the panel removed therefrom, additional annealing processes are not required for further reducing internal stresses. By elimination of most or all of the mold or process induced internal stresses in the panel substrate, the outer surface thereof is more readily bondable with a thin, tough, hard, clear coating of abrasion resistant, polycyloxine resin, and/or an ultra-violet (UV) curable resin layer or protective coating applied by flow coating, dipping or spraying.

The abrasion resistant, glossy appearing, clear, protective coating surface layer is applied in a processing environment having a high degree of cleanliness and precise humidity control, preferably in a relative humidity range of between 35% to 50%. A suitable curing time is provided to insure an exceptionally clear and hard outer surface coating that is permanently bonded onto the optical quality surface finish of the low stress, injection molded substrate of the panel. The resulting panel is extremely pleasing in appearance and very closely resembles and/or simulates much more expensive cut glass and/or stained glass panels of a prior era.

BRIEF DESCRIPTION OF THE DRAWINGS

For a better understanding of the present invention, reference should be had to the following detailed description taken in conjunction with the drawings, in which.

DETAILED DESCRIPTION OF PREFERRED EMBODIMENTS OF THE PRESENT INVENTION

Figure 1:
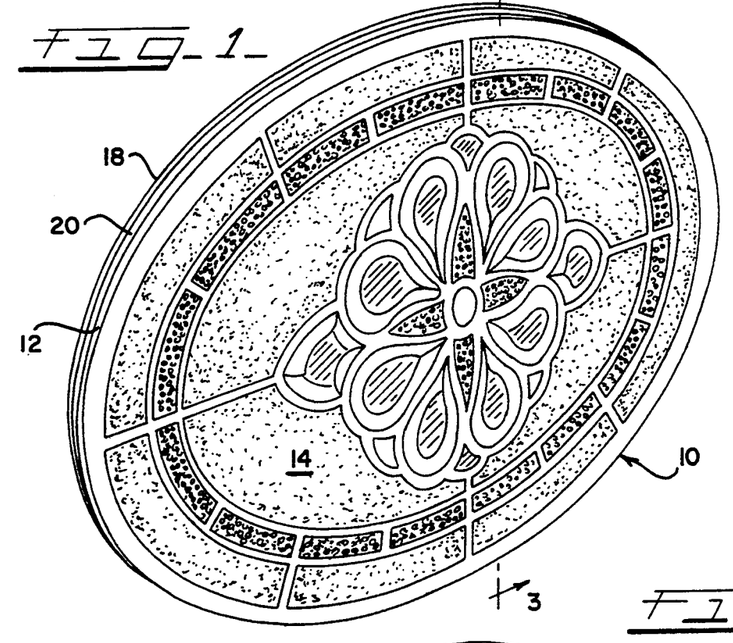
FIG. 1 is a front perspective view of a new and improved decorative, transparent panel unit constructed in accordance with the features of the present invention.
Figure 2:
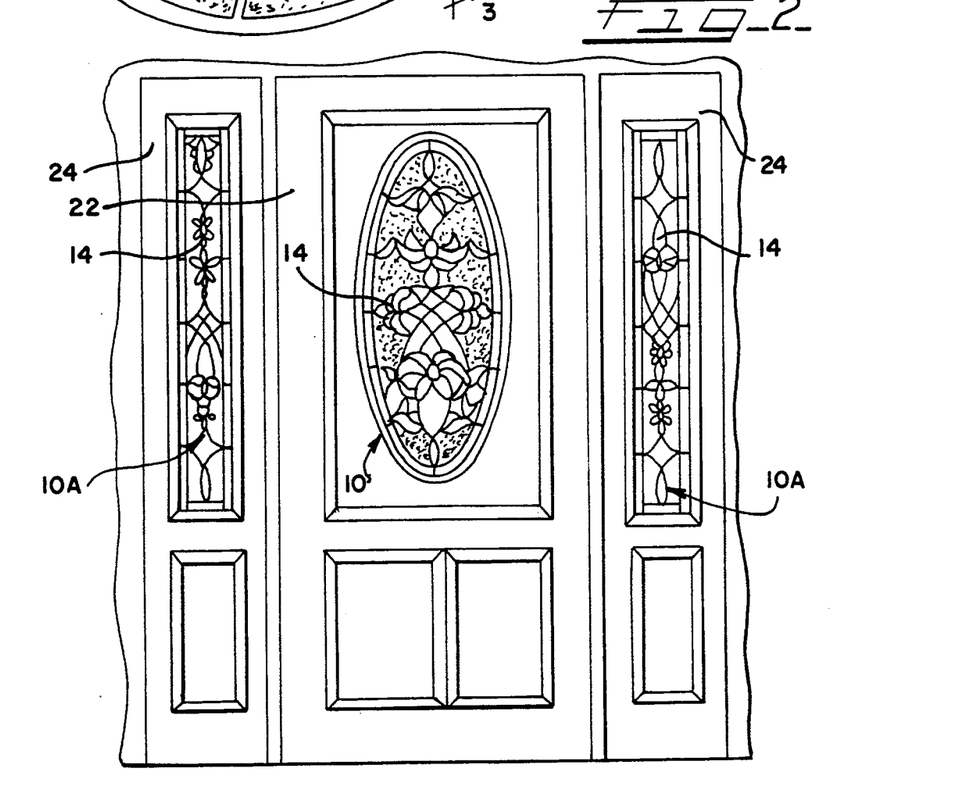
FIG. 2 is an outside front elevational view of a building entrance employing a door and a pair of side lights, all having decorative, light transmitting panels in accordance with the present invention.
Figures 3, 4:
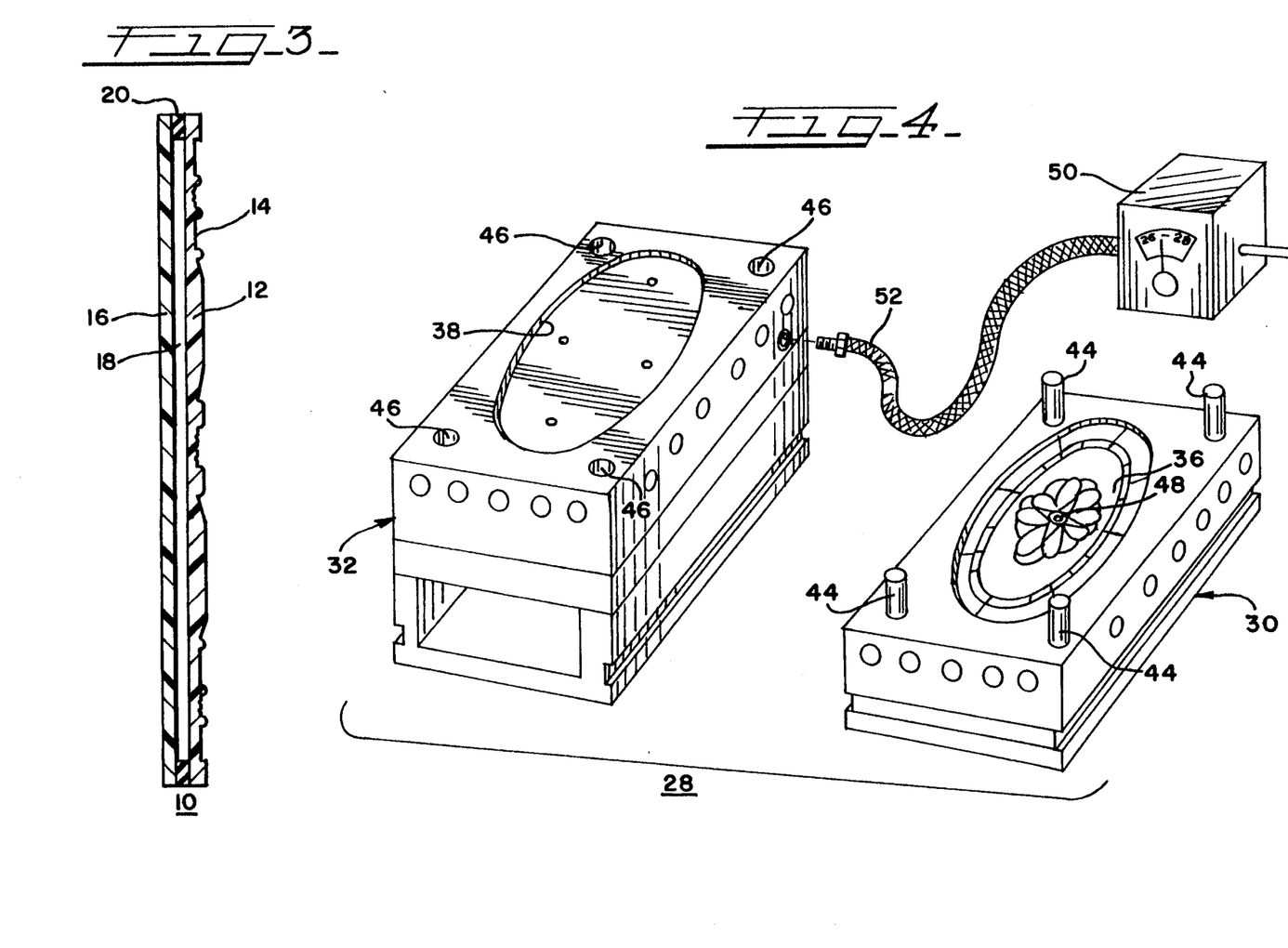
FIG. 3 is a cross-sectional view of the panel structure of FIG. 1 taken substantially along lines 3—3.
FIG. 4 is a schematic diagram illustrating in perspective view a precision injection molding system used for producing the panels in accordance with the present invention.

Referring now to the drawings, in FIGS. 1, 2 and 3 is illustrated a new and improved decorative, light transmitting, insulating panel structure or unit 10 constructed in accordance with the features of the present invention and designed to closely simulate and/or resemble an expensive cut glass or stained glass panel of the type used on doors, windows, transoms, skylights, cabinets, furniture, canopies, light fixtures, etc. The insulating panel unit 10 is provided with an outer panel 12 formed of light transmitting resinous plastic material which includes a decorative outer face 14 having a desired esthetic design thereon, preferably in relatively deep relief so as to closely resemble a leaded, stained glass or cut glass window panel. The outer panel 12 is spaced apart from a flat or planar inner panel 16 providing a dead air space 18 therebetween and a perimeter spacing strip 20 is provided to sealingly join the opposing, relatively flat inside faces of the respective panels 12 and 16 to seal and encapsulate a volume of relatively dry air within the dead air space 18 and thereby provide an integral panel unit 10 having excellent heat insulating characteristics suitable for use in an entrance door 22 or panel units 10A used in a pair of side lights 24 as illustrated in FIG. 2. The insulating panel units 10 and 10A have a wide variety of other applications such as in windows, transoms, skylights, cabinet fronts, furniture doors, canopies, light fixtures, etc.

In accordance with the present invention, the outer panel 12 is constructed of a mold formed substrate of polycarbonate or acrylic, plastic resin and these resins are chosen because of their clarity and high light transmission capability. Moreover, these resins have a relatively low thermal conductivity, high impact strength, are relative low cost, and have an excellent ability to withstand ultraviolet light and weather exposure for long periods of time without substantially discoloring, crazing or cracking, even when subjected to a relatively high degree of physical abuse.

The resins are molded in a low stress, high temperature injection molding process as described hereinafter wherein the finished molded panels have very low permanent internal stresses, typically ranging between 400 psi and 1500 psi psi after manufacture and final curing is completed. Preferably the internal stresses developed in the resinous material while flowing into the mold and during the molding process is maintained at a level of 1500 psi maximum or below.

In order to produce these low stress molded panels 12, the resin is injected into the mold cavity at or near a high temperature limit as recommended by the resin manufacturer. For example, when polycarbonate resin is utilized, a temperature of 600° to 610° F. is used to increase fluidity and assist in the flow of the resin material across the cores and into the cavities of the mold. Initial injection pressure at the inlet of the mold may be as high as 60,000 psi with a range of 30,000 psi to 60,000 psi preferred so as to rapidly deliver the needed quantity of resin to fill the mold cavity in an extremely short period of time, for example, abut one or two seconds.

In addition, while the injection molding process takes place, the mold cavity ahead of the flowing resin is being evacuated by means of a vacuum pump so that the liquid resin is both pushed and pulled rapidly into the mold cavity. A vacuum range in the order of 27 to 28 inches of mercury below atmospheric is preferably maintained from a the suction line connected between the mold cavity and a vacuum pump.

The resin of the panel substrate is cured while within the mold cavity during a 25 to 45 second time interval after mold filling and the time required is dependent upon the wall thickness of the panel being molded. When relatively thick ribs or wall sections are needed, additional curing time in the mold cavity is provided; for example, 60 to 90 seconds may be required. Additional curing time of up to 4 hours at a temperature range of 220°-240° F. and a dew point temperature of −20° F. may also be provided when necessary.

The combination of high initial resin temperature (575° F.–610° F.), high mold surface temperatures (200° F.–230° F.) in the entry portion of the mold cavity and high initial injection pressure is extremely important in producing a final low internal stress condition in a finished molded panel 12.

In the past, conventional injection molding processes often resulted in relatively high internal stresses being developed in molded plastic panels; sometimes in excess of 2,500 psi . With stresses at this level, the quality of adhesion between these prior art molded panels and the hard surface coating applied thereto was low resulting in the formation of micro-cracks in the coating layer and delamination between the resin substrate and the outer coating layer when subjected to normal thermal cycling between −40° F. and +170° F.

These tendencies to form micro-cracks in the outer coating layer and delamination of the outer coating layer from the molded underlying plastic resin substrate is believed to be a result of the relatively high internal stress levels produced in the base substrate in a conventional molding operation. When such thermal cycling occurs , the high level of internal stress results in a substantial movement of the base resinous substrate which tends to foster micro-cracking and delamination. In order to reduce this tendency, it was often necessary to post anneal the panels in another secondary operation which is costly and time consuming. Moreover, typical annealing processes have a wide range of variables and inconsistency results unless highly accurate control is provided, which again is costly and time consuming.

The relatively low levels of process-induced, internal stress provided in the molded plastic substrates produced in accordance with the teachings of the present invention, result in a greatly improved permanent adhesion between the substrate surface and the hard protective outer coating layer, and expensive and time consuming post annealing operations are eliminated altogether. In the past, it was common to provide a post annealing process in order to reduce internal stress down to levels of approximately 750 psi in the substrate panel and the elimination of this costly and difficult to control secondary operation is a great economic incentive provided by the present invention.

In accordance with the invention, after a substrate panel 12 is molded in the manner described to insure a low level of process induced internal stress of 1500 psi or less, and after a final curing of the panel is completed forming an optical quality surface finish on the decorative outer face 14 of the substrate, a thin, clear, light transmitting, abrasion resistant, ultra-violet light resistant, relatively hard, protective coating or layer of plastic resin is applied to the outer surface of the substrate. This thin outer protective layer may reach a maximum thickness of up to 1 mil and adheres to the surface of the substrate to form a permanent bond against later delamination. The protective layer is cured by the passage of the panels 12 under a heat lamp and in a typical operation, the panels may move at a velocity of 15 to 30 feet per minute past the heat lamp so that surface temperatures of 220° F. to 240° F. are present on the thin, hard, outer protective layer or coating.

The hard surface protective layer or coating provides excellent abrasion resistance and excellent resistance to deterioration of the panel units 10 and 10A and the substrate thereof when prolonged exposure to the weather and/or ultra-violet light is experienced. Moreover, outer panels 12 produced in the aforementioned method, are well able to resist delamination between the substrate and outer protective coating layer.

Typically a suitable outer protective layer comprises a polysiloxane resin which is applied to the cured substrate in a flow coating, dip coating or spray coating operation so that the resulting decorative outer panel surface 14 assumes a high gloss, hard finish which closely resembles a beveled glass or stained glass window depending upon the intricacies of the pattern or design. Such a decorative outer face 14 may normally include segments of beveled glass and elongated rounded strips resembling lead strips commonly used in joining small glass segments together in a larger beveled or stained glass panel. In prior leaded glass panels, the areas along the lead strips were especially weak or low in strength often resulting in premature breakage or damage when subject to only normal usage. Moreover, the areas along the lead strips are thermally inefficient and result in excessive heat losses and the attendant problems of frosting up and sweating. However, in the present invention, the panels are mold formed in one single piece and thus are much stronger and resist impact forces much better than prior glass panels formed from a plurality of small glass elements joined together by soft lead strips. Moreover, to the untrained eye, it is often difficult to ascertain that the panels 12 in accordance with the present invention are not indeed actually panels made of stained glass or cut glass, like the original types of leaded stained glass panels of a prior era.

The molded-in-place lead lines or strips of the decorative panels 10/10A of the present invention may be decorated to truly resemble real lead strips by painting and/or by a process known as sputtering and/or vacuum deposition of metals such as brass, copper, pewter, etc. In the latter two processes, the metals can be deposited in a thin film on the surface of the molded-in-place plastic bead to thicknesses of ½ to 1 mil.

In accordance with the present invention, the panels 10/10A can be easily tinted to the shade or color desired by the introduction of tinting material into the molding resin of the substrate prior to or during the molding process. The tinted panels offer improved thermal efficiencies and reduce the transmission of light. The tinting shapes may be of a type that especially reduces harmful infared and UV range radiation through the panel. Polycarbonate and acrylic substrates, can be easily and economically tinted to make architecturally pleasing bronze, grey, etc. shades that provide decorative alternatives to clear, glass-like or other traditional panels.

In addition to cosmetics, there are two other areas of advantages afforded in tinted panels. The tinting feature provides excellent security to an inside panel user by offering access viewing to the outside, while at the same time providing obscurity when an intruder looks inside, because of the light transmission reduction of the tinted panels (20%-60%). A user can easily observe a would-be intruder's activity through a tinted panel doorlite. The user's position in order to make such observations, often places him/her in an extremely close objectionable position in an entryway except that the inside user is now securely protected in these precarious positions by the high security panels 10/10A. Panels 10/10A of polycarbonate resin provide superior vandal and intruder resistance so that damage is minimized while an inside user is closely watching an intruder from safety within because the panels are virtually unbreakable under normal impact and methods of entry. Often a double panel unit of polycarbonate resin in a doorlite of the invention provides strength and impact resistance superior to the metal, wood, or fiberglass door surround, all the while providing the beauty of a classic design.

Security from small caliber firearms has also been proven in double panel constructions using a 3/16" panel thickness on the outside and a minimum of ⅛" panel thickness on an inside insulating or safety panel. A double panel polycarbonate doorlite panel 10/10A offers great cost savings in comparison to bullet resistant tempered glass. Double polycarbonate panels have been found to eliminate small caliber bullet penetration through the second or inside panel or reduce penetration speed and impact significantly and accordingly, these panels may avoid a loss of life.

Architectural and seurity tints offer reduced light transmission of harmful sunlight containing infared and UV ranges of light with the effect of retaining heated or cooled air on the inside of a structure. This feature provides economy through heating and cooling cost reductions and in certain circumstances protects sun damage to interior furnishings and fixtures. Real tinted glass is extremely expensive in decorative glass doorlites and sidelites, whereas the panels 10/10A are readily affordable.

The safety and security features of the new vandal resistant panels 10/10A provide new architectural freedom in areas previously declared as unsafe or hazardous and offer a great improvement in installations wherein glass breakage is a hazard such as in shared dwellings, townhouses, condominiums, public buildings and common use entryways that require viewing and/or light transmittance for esthetics and decorative purposes.

Figure 5:
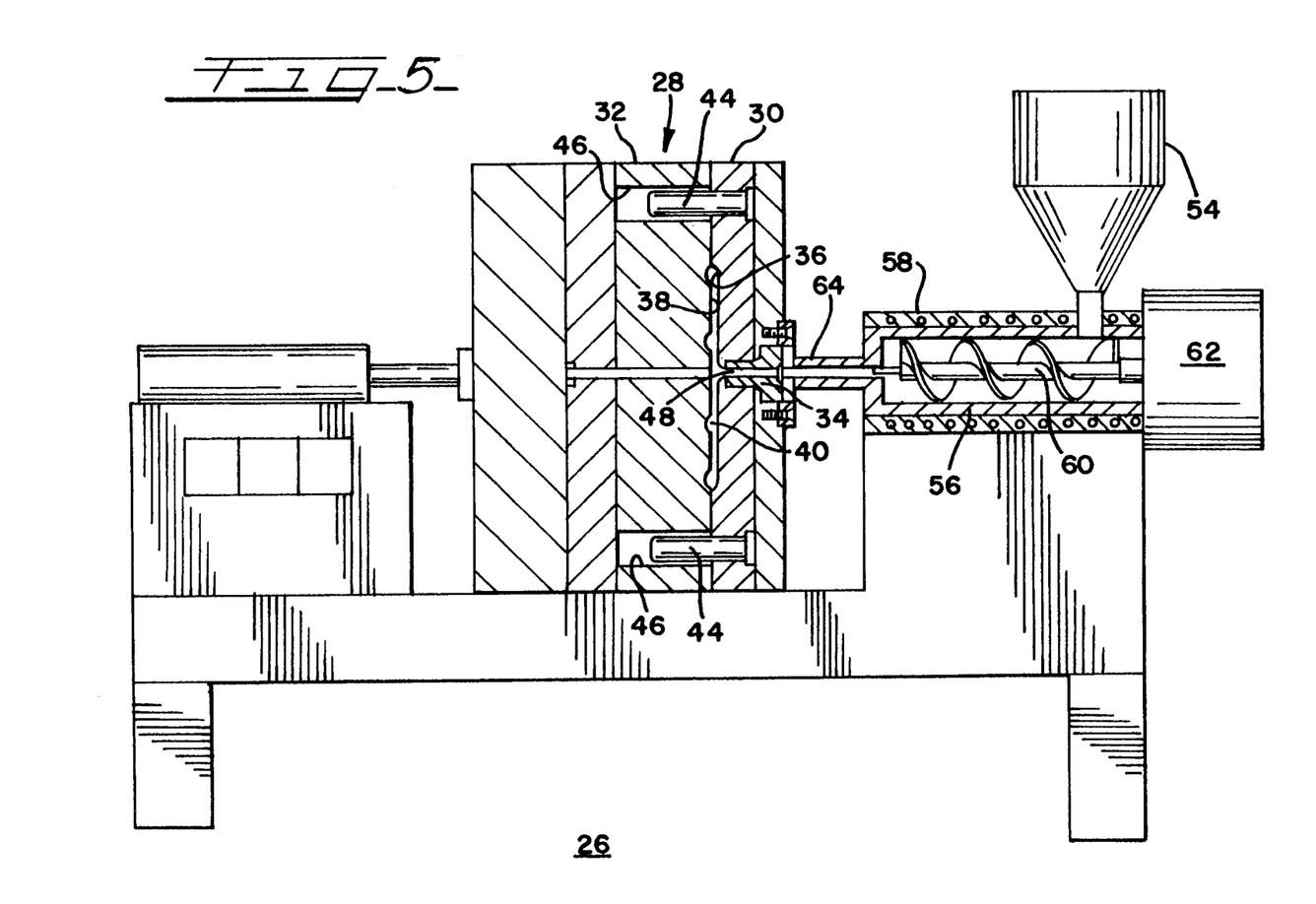
FIG. 5 is a longitudinal cross-sectional view of a typical injection molding machine utilized for making panels in accordance with the present invention.
Figures 6, 7:
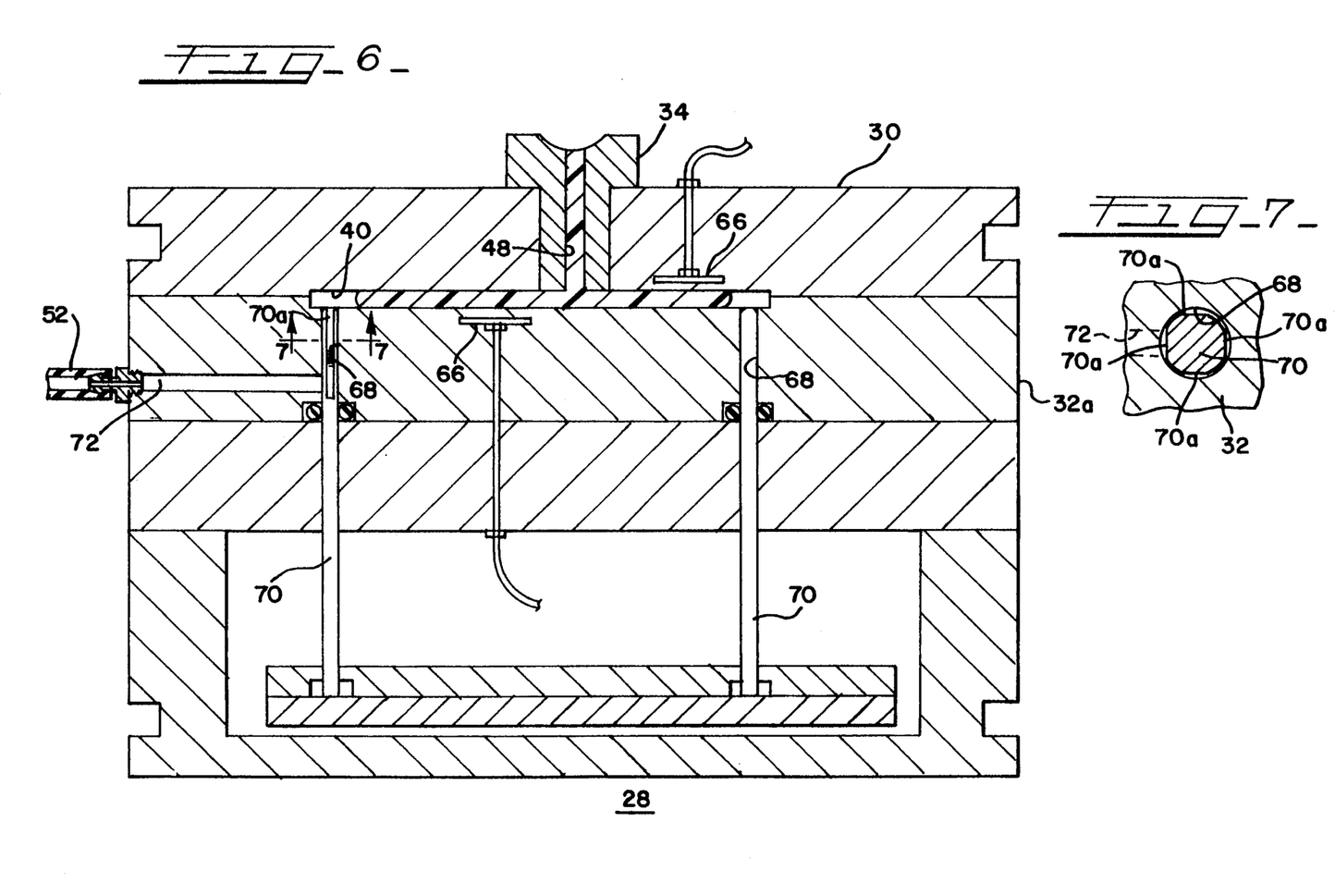
FIG. 6 is an enlarged fragmentary cross-sectional view of a typical precision injection mold of a type suitable for producing panels in accordance with the present invention.
FIG. 7 is a fragmentary cross-sectional view taken substantially along lines 7—7 of FIG. 6.
Figures 8, 9:
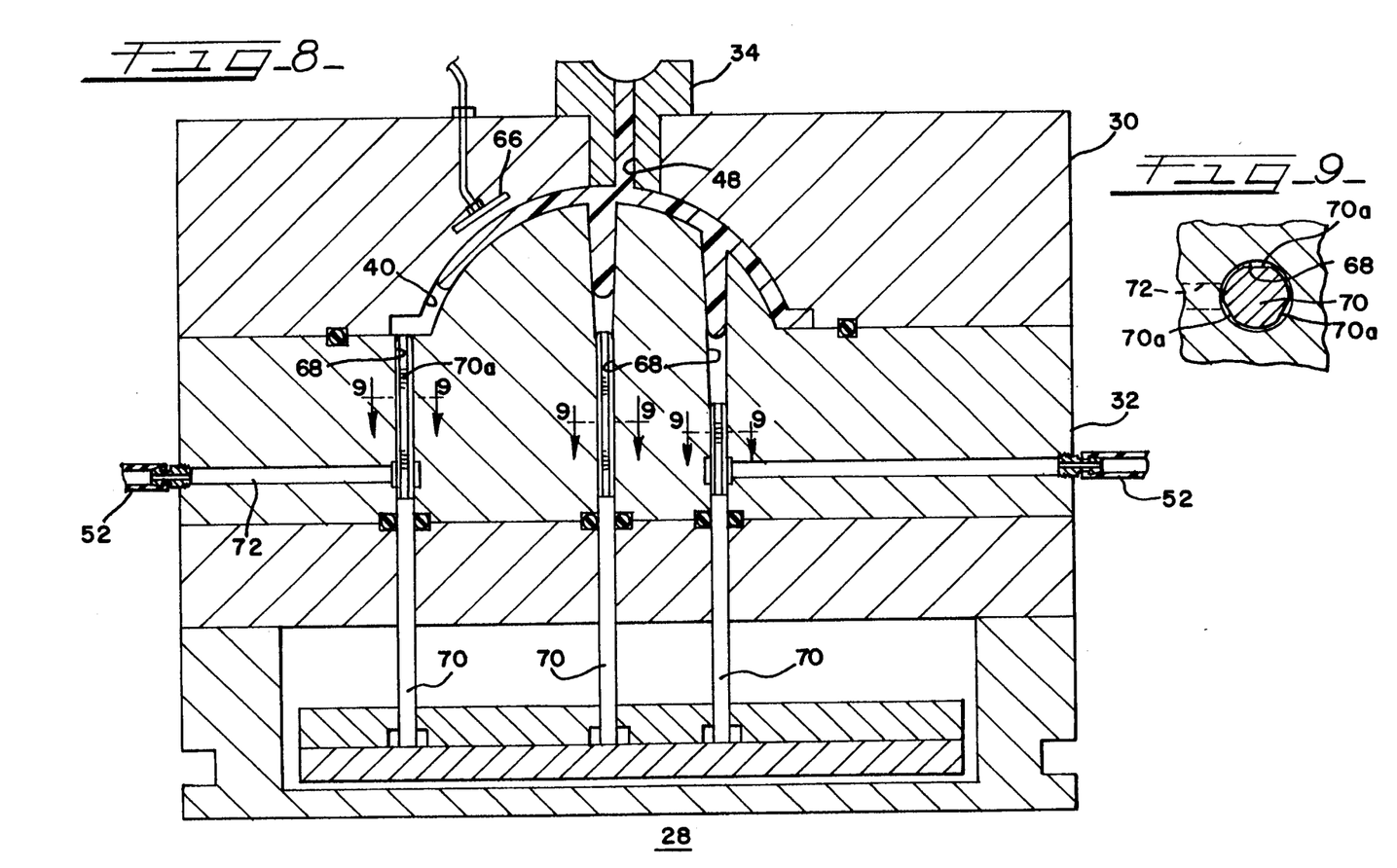
FIG. 8 is an enlarged, fragmentary cross-sectional view of a typical injection molding system of a type suitable for manufacturing molded light transmitting panels in accordance with the present invention.
FIG. 9 is a fragmentary cross-sectional view taken substantially along lines 9—9 of FIG. 8.

Referring to FIGS. 4 and 5, a typical precision injection molding system 26 suitable for producing the panels 10/10A in accordance with the present invention includes a mold assembly 28 having a cope 30 and drag 32 for receiving resinous plastic material injected through a nozzle structure 34 secured to the cope 30 as shown in FIGS. 5, 6 and 8. The cope 30 is formed with a highly polished recessed cavity surface 36 as shown in FIG. 4 for producing the desired decorative design for the outer face 14 of a substrate panel 12. The drag 32 is provided with a more shallow, flat mold cavity 38 designed to confront or face the decorative cavity surface 36 and together form an injection mold cavity 40, FIG. 5, when the cope and drag 30 and 32 are assembled together. The cope and drag are maintained in precision alignment by means of a plurality of alignment pins 44 on the cope 30 which extend into recesses 46 provided in the drag 32. Liquid resin entering the mold cavity 40 (FIG. 5) flows through a central filling sprue 48 to rapidly fill the cavity 40 which is continuously being evacuated through a connection to a vacuum source such as a vacuum pump 50 by one or more flexible vacuum lines 52 connected to the drag 32 of the mold assembly 28.

Typically, the molding system 26 includes a hopper 54 for holding a supply of resin in pellet or bead form and the resin pellets flow from the hopper into an extrusion chamber 56 heated with a surrounding heating jacket 58 to melt the resin pellets into a liquid state by raising the temperature up to a desired temperature range of 600 to 610° F. A rotary ejector screw 60 is mounted in the extrusion chamber 56 and is driven from an outer end by a rotary power source such as an electric motor driven gear motor 62. As the screw rotates in the heated extrusion chamber 56, the solid resin pellets are melted and are subjected to relatively high extrusion pressures in the range of 30,000 psi to 60,000 psi by the time the resin reaches an outlet or discharge conduit 64 at the outlet end of the extrusion chamber 56.

The discharge conduit 64 is in direct communication with the injection nozzle 34 and the hot fluid resinous material is rapidly injected into the mold cavity 40 as the injection screw 60 turns within the heated extrusion chamber 56. As previously indicated, the surface area of the mold cavity surfaces 36 and 38 closely adjacent to the inlet sprue 48 are maintained at a relatively high temperature level so as to preclude premature crusting or cooling of the hot injected resin.

For the purpose of monitoring and maintaining the surfaces of the mold cavity 40 at the desired temperature range, a plurality of temperature sensing elements 66 are provided in the cope and drag 30 and 32 so that mold surface temperature may be closely monitored and maintained at a desired temperature range.

Referring specifically to FIGS. 6–9, as therein shown, liquid resin enters the mold cavity 40 from the central feeding sprue 48, and the resin flows rapidly out to fill the mold cavity 40. The resin advances at a rapid rate due to the initially high temperature and the initially high injection pressure. Moreover, in order to further assist in the rapid filling of the mold cavity 40, the vacuum pump 50 is energized to operate via one or more vacuum lines 52 connected to the drag 32 so that air is removed from the mold cavity 40 ahead of the advancing flow of resin as shown in FIGS. 6 and 7 until the mold cavity is completely filled.

In accordance with the invention, the vacuum assist is provided through a plurality of cylindrical passages 68 in which are mounted ejector or knock-out pins 70 for use in ejecting a solidified resinous panel from the mold cavity 40 when the cope 30 and drag 32 are separated or opened after a panel 12 is solidified. As illustrated in FIGS. 6 and 8, the ejector pin passages 68 are in communication with one or more of the vacuum lines 52 through vacuum bleed passages 72 extending generally at right angles thereto. As illustrated in FIGS. 7 and 9, the ejector pins 70 are provided with planar flats 70a extending along the length thereof and these flats cooperate with the cylindrical bore of the ejector pin passages 68 to form a plurality of small vacuum bleed passages for interconnecting the flexible vacuum line 52 and the passages 72 and 68 with the vacuum pump 50 so that a vacuum assist is provided in the mold cavity 40 as the resin moves rapidly to fill out the full cavity space.

Many modifications and variations of the present invention are possible in light of the foregoing specification and thus, it is to be understood that within the scope of the appended claims, the invention may be practiced otherwise than as specifically described.

What is claimed and desired to be secured by Letters Patent of the United States is:

1. A light transmitting panel having opposite inner and outer surfaces, including:
   a substrate formed of molded, light transmitting plastic resin having a level of process-induced internal stress of approximately 1500 psi or less after molding and at least one optical-quality surface finish underlying said outer panel surface for optimizing light transmission through said resin; and
   a thin, tough, transparent, abrasion and chemical resistent, and ultraviolet light resistant, relatively hard protective coating layer containing silicon applied in a liquid form and permanently bonded to said optical-quality surface finish of said substrate to form at least one outer surface of said panel;
   whereby said process-induced internal stress of said substrate is sufficiently low to reduce micro-cracking or delamination of said coating layer from said substrate at least through a temperature range of about −40° F. to about +170° F.

2. The light transmitting panel of claim 1, wherein: said substrate comprises polycarbonate resin formed in a low stress injection molding process.

3. The light transmitting panel of claim 1, wherein: said substrate comprises acrylic resin formed in a low stress injection molding process.

4. The light transmitting panel of claim 1, wherein: said protective layer comprises polysiloxane.

5. The light transmitting panel of claim 1, wherein: said protective layer comprises an ultra-violet light curable resin applied to the substrate in an atmosphere of 35% to 50% relative humidity.

6. The light transmitting panel of claim 1, wherein: said protective layer has an average thickness of less than 1 mill.

7. A decorative panel having a decorative outer surface, comprising:
   a substrate made of mold formed, high strength, plastic resin having an internal stress after molding of approximately 1500 psi or less and a molded, optical-quality, decorative surface underlying said outer panel surface; and
   a thin, abrasion and chemical resistant and ultraviolet light resistant protective coating applied in a liquid form, containing silicon and less than 1 mil thickness permanently adhered to said decorative surface of said substrate providing a high gloss decorative outer surface of said panel;
   whereby said stress of said substrate is sufficiently low to reduce micro-cracking or delamination of said coating from said substrate at least through a temperature range of about −40° F. to about +170° F.

8. The decorative panel of claim 7, wherein: said decorative outer panel surface includes at least one beveled segment resembling a beveled glass design.

9. The decorative panel of claim 7, wherein: said decorative outer panel surface includes at least one portion comprising an elongated strip of outwardly convex transverse cross-section resembling a lead strip between adjacent glass segments in a leaded glass panel design.

10. The decorative panel of claim 7, including in combination:
    a second panel spaced apart from a backside of said decorative panel; and
    perimeter spacing means on the decorative panel and said second panel for interconnecting the same to form an insulating panel structure providing a dead air space between said decorative panel and said second panel.

11. The decorative insulating panel of claim 10, wherein:
    said perimeter spacing means comprises an elongated bead of silicone material adhesively secured between said decorative panel and said second panel for sealing said dead air space.

12. The decorative insulating panel of claim 11, wherein:
    said outer surface of said decorative panel includes at least one beveled surface segment and an adjacent elongated strip of outwardly convex transverse cross-section resembling a leaded glass panel design.

13. The decorative insulating panel of claim 12, wherein:
    said second panel has at least one face formed with a thin, abrasion resistant protective resin coating opposite said decorative outer surface of said decorative panel.

* * * * *